March 26, 1968

L. H. BRIXNER 3,375,464

SINGLE-PHASE, SOLID SOLUTION LUMINESCENT
COMPOSITIONS, PREPARATION THEREOF AND
LASERS CONTAINING SAME

Filed May 14, 1964

2 Sheets-Sheet 1

FLUORESCENT EMISSION SPECTRUM OF $(SmNa)_{.08} Ca_{2.84} (VO_4)_2$

FLUORESCENT EMISSION SPECTRUM OF $(DyNa)_{.08} Ca_{2.84} (VO_4)_2$

INVENTOR
LOTHAR H. BRIXNER

BY Fred C. Carlson

ATTORNEY

FLUORESCENT EMISSION SPECTRUM OF $Nd_{.04}Na_{.04}Ca_{2.92}(VO_4)_2$

United States Patent Office 3,375,464
Patented Mar. 26, 1968

3,375,464
SINGLE-PHASE, SOLID SOLUTION LUMINESCENT COMPOSITIONS, PREPARATION THEREOF AND LASERS CONTAINING SAME
Lothar H. Brixner, Brandywine Hills, Pa., assignor to E. I. du Pont de Nemours and Company, Wilmington, Del., a corporation of Delaware
Filed May 14, 1964, Ser. No. 367,533
13 Claims. (Cl. 331—94.5)

This invention relates to novel luminescent compositions, to processes for producing them, to processes for amplification of light by stimulated emission of radiation from said compositions, and to laser apparatus having a said composition as an essential component thereof. The invention is more particularly directed (1) to single-phase, solid-solution luminescent compositions of the formula $Ln_xNa_xCa_{3-2x}(VO_4)_2$ where Ln is a rare earth element of atomic number 58 through 71 and $x$ has a value of from 0.01 to 0.4, optionally in single-crystal form; (2) to the steps, in processes for producing said compositions, comprising (a) intimately mixing oxygen-containing compounds of a said rare earth element, sodium, calcium, and vanadium, (b) heating the mixture at about 700° C. for from 10 to 14 hours, (c) grinding the resultant product to a fine powder, (d) heating the powder so-obtained at about 1200° C. for from 10 to 14 hours, (e) cooling the product, and (f) optionally, drawing a single crystal from a melt thereof; (3) to the steps, in processes for amplification of light, comprising stimulating by electromagnetic radiation a said luminescent composition in the single crystal state, whereby light of 450 to 1070 millimicron wavelengths in a narrow spectral range is emitted therefrom; and (4) to laser apparatus having as an essential component a said single crystal luminescent composition.

Figure 1:
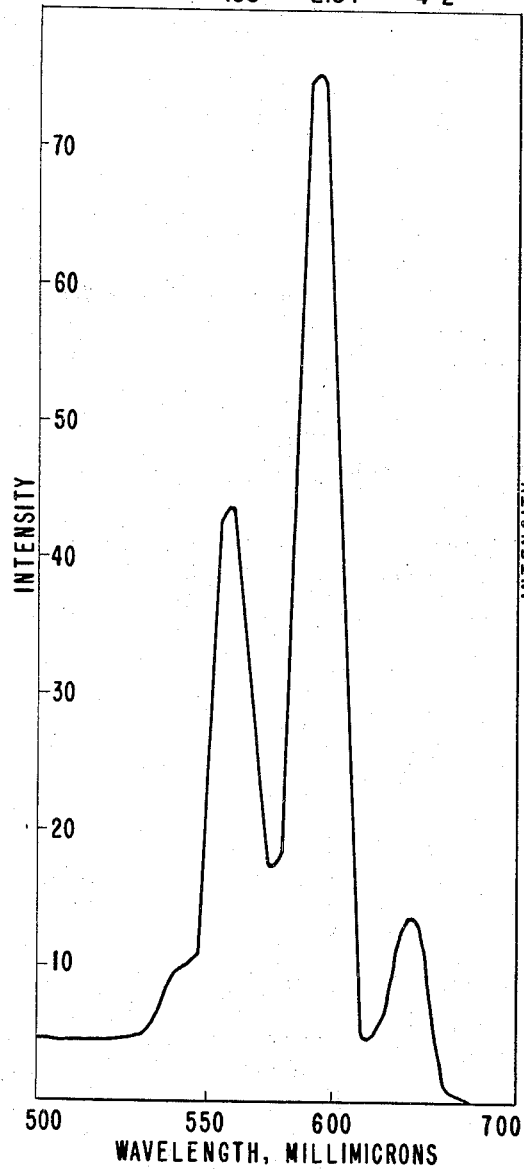
Figure 2:
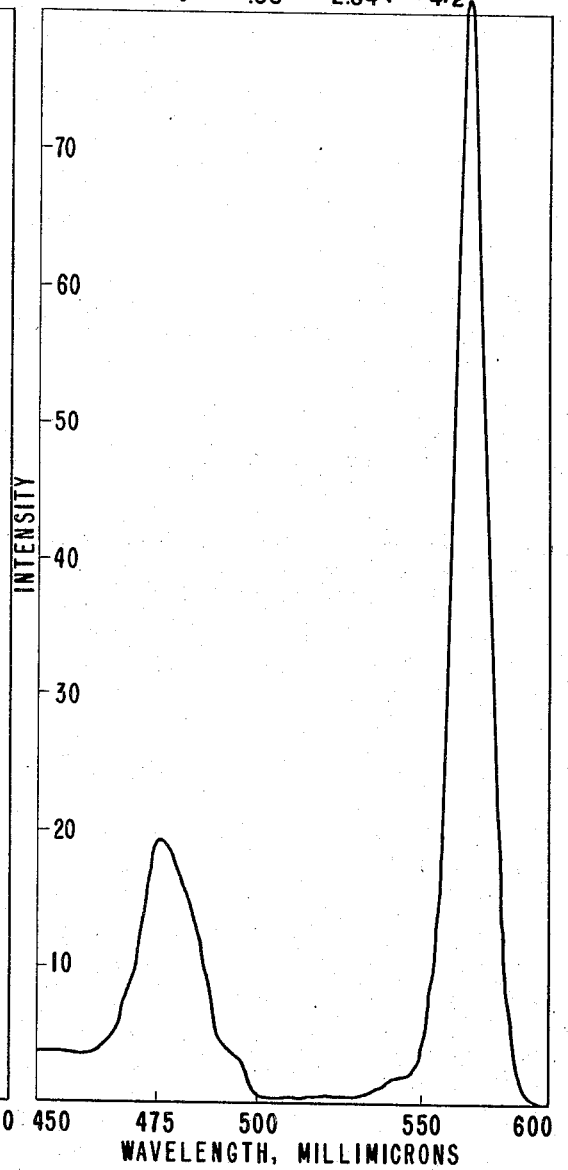
Figure 3:
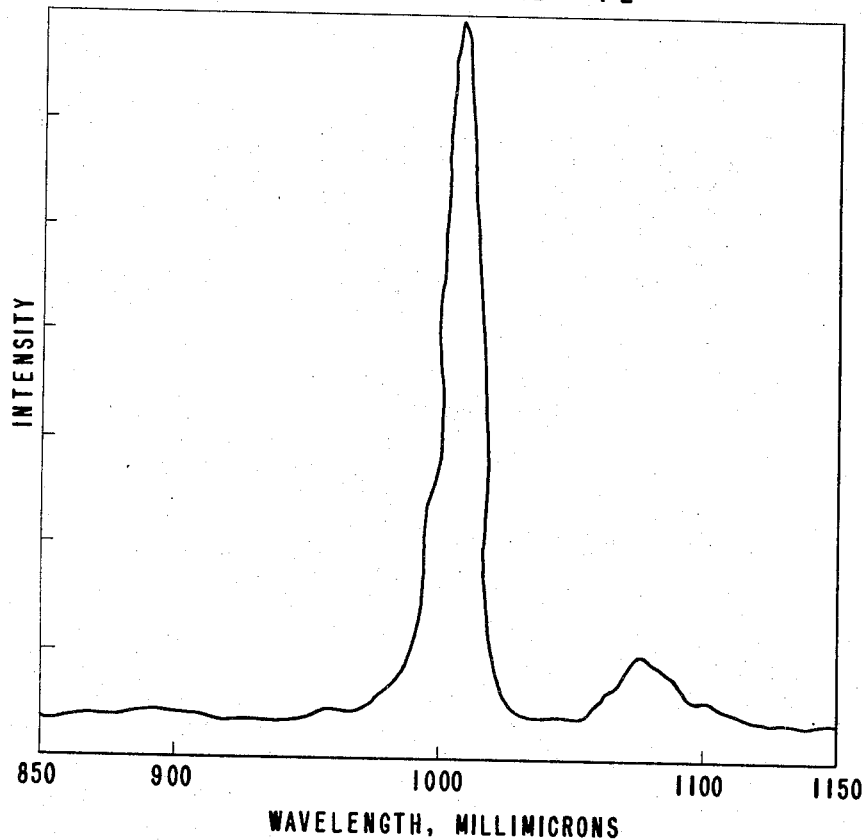

In the drawings:
FIGURE 1 shows the variation of intensity of fluorescent emission in arbitrary units at the indicated wavelengths, of a composition of the invention having the formula $(SmNa)_{.08}Ca_{2.84}(VO_4)_2$, and
FIGURE 2 shows a similar data for $$(Dyna)_{.08}Ca_{2.84}(VO_4)_2$$

and
FIGURE 3 shows similar data for

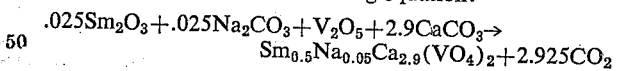
$$Nd_{.04}Na_{.04}Ca_{2.92}(VO_4)_2$$

The novel compositions are useful in the polycrystalline powdered state as phosphors, and in the single crystal state are especially useful as "laser" crystals. The term "laser" is a well-known acronym for light amplification by stimulated emission of radiation. The use of the compositions as laser crystals is made possible by their ability to emit light within a very narrow range of wavelengths under excitation by suitable light, such as that from a mercury vapor or xenon lamp. Such luminescent materials are generally called "line-emitters," as contrasted to "band emitters" which give off radiation over a broad spectral range.

In the compositions, a trivalent rare earth element is substituted for a portion of the calcium in calcium orthovanadate, along with the requisite amount of sodium to restore electroneutrality. This is possible because of the small deviations of ionic radii of $Ca^{+2}$(0.99 A.), $Na^{+1}$(0.94 A.) and $Gd^{+3}$(0.97 A), representing the middle of the lanthanide series of rare earth metals.

Although ions of any of the rare earth elements having atomic numbers 58 through 71 can be incorporated into calcium orthovanadate to replace a portion of the calcium according to the invention, the introduction of the particular rare earth elements neodymium, samarium, europium, terbium, dyprosium, and thulium, together with sodium to restore electroneutrality, has resulted in compositions which are intensely fluorescent under ultraviolet light. Since these compositions exhibit sharp line emission, they are useful as laser crystals when in the single crystal state.

The rare earth-sodium substituted calcium vanadate compositions of this invention have been prepared in both the polycrystalline and single crystalline form. In the preparation of these compositions in the polycrystalline state, the component oxides were weighed to the nearest one-tenth milligram according to the desired stoichiometry, and the mixture reacted in a platinum crucible at 700° C. for from 10 to 14 hours. This primary reaction product was then ball-milled in order to thoroughly homogenize it, and again heated to 1200° C. for from 10 to 14 hours.

To make the novel products in single crystalline form, high purity Ca orthovanadate, $Ca_3(VO_4)_2$, was prepared in polycrystalline form by interacting calcium carbonate with high purity calcium pyrovanadate, $Ca_2V_2O_7$. The calcium pyrovanadate was prepared by precipitation from purified solutions of ammonium vanadate, $NH_4VO_3$, and calcium nitrate, $Ca(NO_3)_2 \cdot 4H_2O$. Single crystals of the novel rare earth-sodium-substituted compositions were then grown by melting the calcium orthovanadate in a platinum-rhodium crucible, adding the necessary quantities of rare earth oxide, sodium carbonate, and vanadium pentoxide according to the composition of product desired, immersing in the melt a small piece or a previously grown single crystal as a seed, and pulling the single crystal at a rate of ½ to 1 inch per hour.

Each of the compositions prepared according to the procedures described herein was analyzed by X-ray diffraction and in no case were lines characteristic of any of the original constituent oxides found to be present. Thus it was established that the products of this invention were all single-phase, solid solution compositions.

The following examples will illustrate in detail the preparation of the rare earth-sodium-substituted, solid solution luminescent compositions of this invention.

*Example 1*

A composition of formula $Sm_{0.05}NA_{0.05}Ca_{2.9}(VO_4)_2$ was prepared as follows: Stoichiometric quantities of calcium carbonate, vanadium pentoxide, samarium oxide, and sodium carbonate were weighed out to the nearest 0.1 mg. according to the following equation:

$.025Sm_2O_3 + .025Na_2CO_3 + V_2O_5 + 2.9CaCO_3 \rightarrow$
$Sm_{0.5}Na_{0.05}Ca_{2.9}(VO_4)_2 + 2.925CO_2$ The amounts of the reactants used were as follows:

| | G. |
|---|---|
| $Sm_2O_3$ | 0.0901 |
| $Na_2CO_3$ | 0.0274 |
| $V_2O_5$ | 1.8801 |
| $CaCO_3$ | 3.0000 |

These materials were thoroughly mixed and were heated in a platinum crucible at 700° C. for 12 hours. At the conclusion of this heating, the crucible was cooled and the contents thoroughly homogenized by ball milling in acetone in an agate mill. The powdered material was then subjected to a second firing step, at a temperature of 1150° C. for 12 hours. The material was cooled in the furnace.

The rare earth-sodium-substituted calcium vanadate product of this reaction was analyzed by X-ray diffraction and was found to be a single phase uniform composition. No lines characteristic of the original reactants were found to be present in the product.

The polycrystalline product was subjected to radiation of a mercury-plus-phosphor lamp FT5/BL (General Electric Co. designation) in a Beckman DK2 recording spectrophotometer and was found to fluoresce strongly in the orange.

*Examples 2 through 8*

Using the same procedure as described in Example 1, but with stoichiometric quantities of reactants to produce compositions as given below, other single phase, solid solution luminescent compositions were prepared.

| Example | Composition | Grams of Reactants Used | | | |
|---|---|---|---|---|---|
| | | $Sm_2O_3$ | $NaCO_3$ | $V_2O_5$ | $CaCO_3$ |
| 2 | $Sm_{0.06}Na_{0.06}Ca_{2.88}(VO_4)_2$ | 0.1089 | 0.0331 | 1.8930 | 3.0000 |
| 3 | $Sm_{0.07}Na_{0.07}Ca_{2.86}(VO_4)_2$ | 0.1279 | 0.0389 | 1.9062 | 3.0000 |
| 4 | $Sm_{0.08}Na_{0.08}Ca_{2.84}(VO_4)_2$ | 0.1472 | 0.0447 | 1.9197 | 3.0000 |
| 5 | $Sm_{0.10}Na_{0.10}Ca_{2.80}(VO_4)_2$ | 0.1866 | 0.0567 | 1.9470 | 3.0000 |
| 6 | $Sm_{0.12}Na_{0.12}Ca_{2.76}(VO_4)_2$ | 0.2272 | 0.0691 | 1.9755 | 3.0000 |
| 7 | $Sm_{0.14}Na_{0.14}Ca_{2.72}(VO_4)_2$ | 0.2689 | 0.0817 | 2.0043 | 3.0000 |
| 8 | $Sm_{0.2}Na_{0.2}Ca_{2.6}(VO_4)_2$ | 0.4019 | 0.1222 | 2.0997 | 3.0000 |

Each of these compositions was tested for fluorescence by exposure to ultra-violet radiation in the 2000° A. to 4000° A. range and was found to emit strongly in the orange. There is shown in FIGURE 1 the intensity of fluorescence plotted against wavelength in mµ for the composition $Sm_{0.08}Na_{0.08}Ca_{2.84}(VO_4)_2$. This shows this composition to be a sharp line emitter, which characteristic makes it useful as a laser crystal when in the single crystal form. Maximum intensity of fluorescence occurred when the value of $x$ was 0.08.

*Examples 9 through 14*

Following the procedure of Example 1, compositions of europium-sodium-substituted calcium vanadates of composition $Eu_xNa_xCa_{3-2x}(VO_4)_2$ were prepared where $x$ had a value of 0.04 to 0.4. These compositions, and the weights of reactants used to prepare them were as follows:

| Example | Composition | Grams of Reactants Used | | | |
|---|---|---|---|---|---|
| | | $Eu_2O_3$ | $Na_2CO_3$ | $CaCO_3$ | $V_2O_5$ |
| 9 | $Eu_{0.04}Na_{0.04}Ca_{2.84}(VO_4)_2$ | 0.0723 | 0.0219 | 3.0000 | 1.8672 |
| 10 | $Eu_{0.08}Na_{0.08}Ca_{2.84}(VO_4)_2$ | 0.1485 | 0.0467 | 3.0000 | 1.9197 |
| 11 | $Eu_{0.1}Na_{0.1}Ca_{2.8}(VO_4)_2$ | 0.1884 | 0.0567 | 3.0000 | 1.9470 |
| 12 | $Eu_{0.2}Na_{0.2}Ca_{2.6}(VO_4)_2$ | 0.459 | 1.1221 | 3.0000 | 2.0970 |
| 13 | $Eu_{0.3}Na_{0.3}Ca_{2.4}(VO_4)_2$ | 0.6594 | 0.1986 | 3.0000 | 2.2716 |
| 14 | $Eu_{0.4}Na_{0.4}Ca_{2.2}(VO_4)_2$ | 0.9591 | 0.2889 | 3.0000 | 2.4780 |

As in the previous examples, these products were analyzed by X-ray diffraction procedures and were found to be single-phase solid solutions in which none of the original components was present. Maximum fluorescence was found to occur when $x$ has a value of 0.3.

*Examples 15 through 22*

Using the same procedure as given in Example 1, but using the rare earth oxide $Dy_2O_3$, other rare earth-sodium-substituted calcium vanadates were prepared. The compositions of these, and the weights of reactants used were as follows:

| Example | Composition | Grams of Reactants Used | | | |
|---|---|---|---|---|---|
| | | $Dy_2O_3$ | $Na_2CO_3$ | $V_2O_5$ | $CaCO_3$ |
| 15 | $Dy_{0.02}Na_{0.02}Ca_{2.96}(VO_4)_2$ | 0.0378 | 0.0107 | 1.8419 | 3.0000 |
| 16 | $Dy_{0.04}Na_{0.04}Ca_{2.92}(VO_4)_2$ | 0.0766 | 0.0221 | 1.8672 | 3.0000 |
| 17 | $Dy_{0.06}Na_{0.06}Ca_{2.88}(VO_4)_2$ | 0.1165 | 0.0331 | 1.8930 | 3.0000 |
| 18 | $Dy_{0.08}Na_{0.08}Ca_{2.84}(VO_4)_2$ | 0.1575 | 0.0447 | 1.9197 | 3.0000 |
| 19 | $Dy_{0.1}Na_{0.1}Ca_{2.80}(VO_4)_2$ | 0.1997 | 0.0567 | 1.9470 | 3.0000 |
| 20 | $Dy_{0.12}Na_{0.12}Ca_{2.76}(VO_4)_2$ | 0.2431 | 0.0691 | 1.9755 | 3.0000 |
| 21 | $Dy_{0.14}Na_{0.14}Ca_{2.72}(VO_4)_2$ | 0.2877 | 0.0817 | 2.0043 | 3.0000 |
| 22 | $Dy_{0.2}Na_{0.2}Ca_{2.6}(VO_4)_2$ | 0.4300 | 0.1222 | 2.0997 | 3.0000 |

FIGURE 2 shows intensity of fluorescence plotted versus wavelength in mµ for the composition

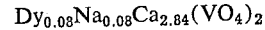

$$Dy_{0.08}Na_{0.08}Ca_{2.84}(VO_4)_2$$

The narrow band of wavelengths through which fluorescence occurs for this composition shows it to be a sharp line emitter indicating its value as a laser crystal when in the form of a single crystal. Maximum fluorescence was formed in this series when $x$ had a value of 0.1.

*Examples 23 through 29*

In the same manner as Example 1, thulium-sodium-substituted calcium vanadates were prepared in which $x$ in the formula $Tm_xNa_xCa_{3-2x}(VO_4)_2$ had a value of from 0.01 to 0.2. These compositions and the amounts of reactants used to prepare them were as follows:

| Example | Composition | Grams of Reactants Used | | | |
|---|---|---|---|---|---|
| | | $Tm_2O_3$ | $Na_2CO_3$ | $CaCO_3$ | $V_2O_5$ |
| 23 | $Tm_{0.01}Na_{0.01}Ca_{2.98}(VO_4)_2$ | 0.0194 | 0.0053 | 3.0000 | 1.8294 |
| 24 | $Tm_{0.02}Na_{0.02}Ca_{2.96}(VO_4)_2$ | 0.0391 | 0.0107 | 3.0000 | 1.8420 |
| 25 | $Tm_{0.03}Na_{0.03}Ca_{2.94}(VO_4)_2$ | 0.0590 | 0.0162 | 3.0000 | 1.8543 |
| 26 | $Tm_{0.04}Na_{0.04}Ca_{2.92}(VO_4)_2$ | 0.0792 | 0.0219 | 3.0000 | 1.8672 |
| 27 | $Tm_{0.08}Na_{0.08}Ca_{2.84}(VO_4)_2$ | 0.1629 | 0.0447 | 3.0000 | 1.9197 |
| 28 | $Tm_{0.1}Na_{0.1}Ca_{2.8}(VO_4)_2$ | 0.2064 | 0.0567 | 3.0000 | 1.9470 |
| 29 | $Tm_{0.2}Na_{0.2}Ca_{2.6}(VO_4)_2$ | 0.4449 | 0.1221 | 3.0000 | 2.0970 |

*Examples 30 through 37*

In the manner of Example 1, a series of neodymium-sodium-substituted calcium vanadates were prepared and tested for fluorescent emission. In this series, the value for $x$ was varied from 0.02 to 0.2 in the formula $$Nd_xNa_xCa_{3-2x}(VO_4)_2$$

The compositions prepared and the amounts of reactants used to prepare them were as follows:

| Example | Composition | Grams of Reactants Used | | | |
|---|---|---|---|---|---|
| | | $Nd_2O_3$ | $Na_2CO_3$ | $CaCO_3$ | $V_2O_5$ |
| 30 | $Nd_{0.02}Na_{0.02}Ca_{2.96}(VO_4)_2$ | 0.0341 | 0.0107 | 3.0000 | 1.8419 |
| 31 | $Nd_{0.06}Na_{0.06}Ca_{2.88}(VO_4)_2$ | 0.1051 | 0.0331 | 3.0000 | 1.8931 |
| 32 | $Nd_{0.08}Na_{0.08}Ca_{2.84}(VO_4)_2$ | 0.1421 | 0.0447 | 3.0000 | 1.9197 |
| 33 | $Nd_{0.09}Na_{0.09}Ca_{2.82}(VO_4)_2$ | 0.1608 | 0.0507 | 3.0000 | 1.9332 |
| 34 | $Nd_{0.10}Na_{0.10}Ca_{2.80}(VO_4)_2$ | 0.1801 | 0.0567 | 3.0000 | 1.9471 |
| 35 | $Nd_{0.11}Na_{0.11}Ca_{2.78}(VO_4)_2$ | 0.1996 | 0.0628 | 3.0000 | 1.9612 |
| 36 | $Nd_{0.12}Na_{0.12}Ca_{2.76}(VO_4)_2$ | 0.2193 | 0.0691 | 3.0000 | 1.9755 |
| 37 | $Nd_{0.20}Na_{0.20}Ca_{2.60}(VO_4)_2$ | 0.3879 | 0.1222 | 3.0000 | 2.0969 |

Maximum fluorescence was obtained when $x$ had a value of 0.1.

Example 38

This example illustrates the preparation of a rare-earth-sodium-substituted calcium vanadate of this invention in single crystal form. A single crystal of $$Nd_{0.04}Na_{0.04}Ca_{2.92}(VO_4)_2$$

was prepared according to the following procedure:

A melt of calcium orthovanadate, $Ca_3(VO_4)_2$ was prepared to which was added stoichiometric quantities of $Na_2CO_3$, $Nd_2O_3$ and $V_2O_5$ to form the desired composition $Nd_{0.04}Na_{0.04}Ca_{2.92}(VO_4)_2$. The reactions which take place to form this composition are the following:

Calcium orthovanadate was prepared by reacting calcium pyrovanadate and calcium carbonate thus:

$$Ca_2V_2O_7 + CaCO_3 \rightarrow Ca_3(VO_4)_2 + CO_2$$

The reactions by which the desired single crystal of $Nd_{0.04}Na_{0.04}Ca_{2.92}(VO_4)_2$ was formed may be considered as taking place in two steps as follows, although in actuality the entire reaction took place in the melt of $Ca_3(VO_4)_2$:

$$3Na_2CO_3 + 3Nd_2O_3 + 4V_2O_5 \rightarrow 4Na_{1.5}Nd_{1.5}(VO_4)_2 + 3CO_2$$

$$0.08Na_{1.5}Nd_{1.5}(VO_4)_2 + 2.92Ca_3(VO_4)_2 \rightarrow$$
$$3Nd_{0.04}Na_{0.04}Ca_{2.92}(VO_4)_2$$

To effect the formation of the desired crystal of $Nd_{0.04}Na_{0.04}Ca_{2.92}(VO_4)_2$, a melt of 73.5 grams of $Ca_3(VO_4)_2$ was prepared in a platinum-rhodium crucible. To this was added 0.4571 gram $Na_2CO_3$, 1.4516 grams $Nd_2O_3$, 1.0460 grams $V_2O_5$.

Using the well-known Czochralski technique, a single crystal was pulled from this melt using a previously prepared seed crystal of $Ca_3(VO_4)_2$. (The lattice parameters of the desired substitutional crystal and of the calcium orthovanadate are almost identical so that such seeding is possible.) The single crystal of $$Nd_{0.04}Na_{0.04}Ca_{2.92}(VO_4)_2$$

was pulled from the melt at the rate of ½ to 1 inch per hour. The crucible and its contents were heated inductively. A single crystal 8 cm. in length and 1 cm. in diameter was prepared as described.

The crystal thus prepared was tested for fluorescent emission and was found to emit sharply at 1.06μ. There is shown in FIGURE 3 the fluorescent emission spectrum of this composition, plotting wavelength versus arbitrary intensity units.

The fluorescent emission spectrum of the single crystal of neodymium-sodium-substituted calcium vanadate of this example, $Nd_{0.04}Na_{0.04}Ca_{2.92}(VO_4)_2$ was examined at liquid nitrogen temperature and the line width of the 1.06μ emission was found to be as narrow as 5 A., making this crystalline composition particularly useful as a laser.

Although the examples given above have described only the preparation of rare-earth-sodium substituted calcium vanadates comprising as the rare-earth element a metal chosen from the group consisting of neodymium, sumarium, europium, dysprosium, and thulium, similar compositions were prepared comprising each of the rare earth metals of atomic number 58 through 71. Many of these compositions, especially the neodymium-substituted compositions exhibited fluorescent emission in the infrared spectral range. However, only the compositions comprising the elements samarium, europium, dysprosium, terbium, and thulium exhibited fluorescence in the visible spectrum.

What is claimed is:

1. A single-phase, solid solution luminescent composition of the formula $Ln_xNa_xCa_{3-2x}(VO_4)_2$ where Ln is a rare earth element of atomic number 58 through 71 inclusive, and $x$ has a value of from 0.01 to 0.4.

2. A composition of claim 1 in single-crystal form.

3. A single-phase, solid solution luminescent composition of formula $Sm_{0.08}Na_{0.08}Ca_{2.84}(VO_4)_2$.

4. A single-phase, solid solution luminescent composition of formula $Dy_{0.1}Na_{0.1}Ca_{2.8}(VO_4)_2$.

5. A single-phase, solid solution luminescent composition of formula $Eu_{0.3}Na_{0.3}Ca_{2.94}(VO_4)_2$.

6. A single-phase, solid solution luminescent composition of formula $Tm_{0.03}Na_{0.03}(Ca_{2.94}(VO_4)_2$.

7. A single-phase, solid solution luminescent composition of formula $Nd_{0.04}Na_{0.04}Ca_{2.92}(VO_4)_2$.

8. In a process for the production of luminescent compositions of the formula $Ln_xNa_xCa_{3-2x}(VO_4)_2$, where Ln is a rare earth metal of atomic number 58 through 71 inclusive and $x$ has a value of from 0.01 to 0.4 inclusive, the steps comprising (a) intimately mixing in stoichiometric quantities oxygen-containing compounds of a said rare earth element, sodium, calcium, and vanadium; (b) subjecting said mixture to a first heating at a temperature of about 700° C. for from 10 to 14 hours; (c) grinding the product of this first heating to a fine powder; (d) subjecting said ground product to a second heating at a temperature of about 1200° C. for from 10 to 14 hours; and (e) cooling the product.

9. In a process for the production of luminescent compositions of the formula $Ln_xNa_xCa_{3-2x}(VO_4)_2$, where Ln is a rare earth metal of atomic number 58 through 71 inclusive and $x$ has a value of from 0.01 to 0.4 inclusive, the steps comprising (a) intimately mixing in stoichiometric quantities oxygen-containing compounds of a said rare earth element, sodium, calcium, and vanadium; (b) subjecting said mixture to a first heating at a temperature of about 700° C. for from 10 to 14 hours; (c) grinding the product of this first heating to a fine powder; (d) subjecting said ground product to a second heating at a temperature of about 1200° C. for from 10 to 14 hours; (e) cooling the product and (f) drawing a single crystal from a melt thereof.

10. In a process for amplification of light by stimulated emission of radiation, the step comprising stimulating by electromagnetic radiation a single crystal of a single-phase, solid-solution luminescent composition of the formula $Ln_xNa_xCa_{3-2x}(VO_4)_2$ where Ln is a rare earth element of atomic number 58 through 71 and $x$ has a value of 0.01 to 0.4, whereby light in a narrow spectral range is emitted therefrom.

11. A laser apparatus having as an essential component thereof a single crystal of a single-phase, solid-solution luminescent composition of the formula $$Ln_xNa_xCa_{3-2x}(VO_4)_2$$

where Ln is a rare earth element of atomic number 58 through 71 and $x$ has a value of from 0.01 to 0.4.

12. A laser apparatus having as an essential component thereof a single crystal of a single-phase, solid-solution luminescent composition of the formula $$Nd_{0.1}Na_{0.1}Ca_{2.8}(VO_4)_2$$

13. A laser apparatus having as an essential component thereof a single crystal of a single-phase, solid-solution luminescent composition of the formula $$Eu_{0.3}Na_{0.3}Ca_{2.4}(VO_4)_2$$

References Cited

UNITED STATES PATENTS

| | | | |
|---|---|---|---|
| 3,152,085 | 10/1964 | Ballman et al. | 252—301.4 |
| 3,243,723 | 3/1966 | Van Uitert | 252—301.4 |
| 3,250,722 | 11/1966 | Borchardt | 252—301.4 |
| 3,257,327 | 6/1966 | Nassau | 252—301.5 |

OTHER REFERENCES

Kroger—"Some Aspects of the Luminescence of Solids"—1948, pp. 109, 110, 285, 290, 293, 294, 295, 297 and 298.

TOBIAS E. LEVOW, *Primary Examiner.*

ROBERT D. EDMONDS, *Examiner.*